United States Patent
Reyes Bautista et al.

(10) Patent No.: US 9,644,129 B2
(45) Date of Patent: May 9, 2017

(54) HIGH-PRESSURE/HIGH-TEMPERATURE SOLIDS-FREE FLUID SYSTEM FOR DRILLING, COMPLETING AND REPAIRING PETROLEUM AND GAS WELLS

(75) Inventors: Martin Reyes Bautista, Tlalnepantla (MX); Noe Tellez Reyes, Villahermosa (MX)

(73) Assignee: PROTEXA S.A. DE C.V., Nuevo Leon (MX)

( * ) Notice: Subject to any disclaimer, the term of this patent is extended or adjusted under 35 U.S.C. 154(b) by 0 days.

(21) Appl. No.: 14/009,092

(22) PCT Filed: Apr. 28, 2011

(86) PCT No.: PCT/IB2011/000919
§ 371 (c)(1),
(2), (4) Date: Jan. 8, 2014

(87) PCT Pub. No.: WO2012/131417
PCT Pub. Date: Oct. 4, 2012

(65) Prior Publication Data
US 2014/0148366 A1    May 29, 2014

(30) Foreign Application Priority Data
Mar. 31, 2011 (MX) .................... MX/a/2011/003494

(51) Int. Cl.
*C09K 8/08*        (2006.01)
*C09K 8/12*        (2006.01)
(Continued)

(52) U.S. Cl.
CPC ............... *C09K 8/035* (2013.01); *C09K 8/08* (2013.01); *C09K 8/10* (2013.01); *C09K 8/12* (2013.01);
(Continued)

(58) Field of Classification Search
CPC ... C09K 8/02; C09K 8/03; C09K 8/04; C09K 2208/04; C09K 2208/18; C09K 2208/22
(Continued)

(56) References Cited

U.S. PATENT DOCUMENTS 3,025,234 A * 3/1962 Canterino .................... 507/119
4,490,261 A   12/1984 Heilweil
(Continued)

FOREIGN PATENT DOCUMENTS

WO        00/60023 A2    10/2000
WO     2012131417 A1    10/2012

OTHER PUBLICATIONS

MSDS of LOSURF-300D from Halliburton, May 6, 2009.*
International Search Report for International Application No. PCT/IB2011/000919, dated Nov. 28, 2011.

*Primary Examiner* — Aiqun Li
(74) *Attorney, Agent, or Firm* — Polsinelli PC

(57) ABSTRACT

The present invention relates to the composition, preparation method and use of a solids-free drilling fluid system formulated with a mixture of divalent heavy brines, which is resistant to high pressures and high temperatures. The system has the special feature that it significantly reduces productive-formation permeability damage as it uses mixtures of different salts of water-soluble divalent metals to provide the features of density, polymers and special additives to provide the system with the physicochemical properties that any fluid for drilling, completing and repairing wells requires in order to fulfill the functions thereof and to provide heat resistance up to 200° C. A main feature of the present invention is that the composition that embeds the drilling/completing/repairing of oil wells fluid contains synthetic polymers and biopolymers that do not require large amounts of time, high shear speeds or heating for hydration thereof in divalent metal salt derived simple or binary brines.

15 Claims, 3 Drawing Sheets

(51) Int. Cl.
- *C09K 8/54* (2006.01)
- *C09K 8/68* (2006.01)
- *C09K 8/60* (2006.01)
- *C09K 8/74* (2006.01)
- *C09K 8/035* (2006.01)
- *C09K 8/10* (2006.01)
- *C09K 8/508* (2006.01)
- *C09K 8/514* (2006.01)

(52) U.S. Cl.
CPC ............ *C09K 8/5083* (2013.01); *C09K 8/514* (2013.01); *C09K 2208/12* (2013.01); *C09K 2208/18* (2013.01)

(58) Field of Classification Search
USPC ........ 507/110, 123, 130, 209, 213, 222, 269
See application file for complete search history.

(56) References Cited

U.S. PATENT DOCUMENTS

| | | | |
|---|---|---|---|
| 5,362,312 A * | 11/1994 | Skaggs et al. | 106/162.8 |
| 5,480,863 A | 1/1996 | Oakley et al. | |
| 6,103,671 A * | 8/2000 | Dobson et al. | 507/261 |
| 2006/0157248 A1 | 7/2006 | Hoefer et al. | |
| 2008/0039347 A1 | 2/2008 | Welton et al. | |

* cited by examiner

HIGH-PRESSURE/HIGH-TEMPERATURE SOLIDS-FREE FLUID SYSTEM FOR DRILLING, COMPLETING AND REPAIRING PETROLEUM AND GAS WELLS

The present application is a national stage application of PCT/IB2011/000919, filed Apr. 28, 2011, which claims priority to MX/a/2011/003494, filed Mar. 31, 2011, both of which are incorporated by reference in their entirety.

TECHNICAL FIELD OF THE INVENTION

The present invention relates to the composition, method of preparation and application of a solids-free fluid system, formulated with a mixture of divalent brines, high pressures and high temperatures resistant, which can be used for drilling, completing and repairing of oil wells, and more specifically for drilling, completing and repairing the productive area of offshore wells, onshore and land-based wells that produce hydrocarbons (crude oil, gas and mixture of oil-gas mixtures and condensates).

Said system has the special feature that it significantly reduces productive formation permeability damage since it uses mixtures of different salts of water-soluble divalent metals to provide the characteristics of density, polymers and special additives to provide the system with the physicochemical properties that any fluid for drilling, completing and repairing wells requires in order to fulfill the functions thereof and, above all, to provide heat resistance up to 200° C., providing lubrication and inhibiting hydration of any clays present in the productive formation pores.

BACKGROUND OF THE INVENTION

For drilling an oil well it is necessary to use a fluid (traditionally known as mud) which can be water-based or oil-based or a gas in order to perform multiple functions. This fluid must, among other things, counter the pressure of the drilling fluids cool and lubricate the drill bit, carry the drilled cuttings to the surface for being separated and recycled, previous conditioning, for re-entering same to the well itself.

During the drilling operations several formations are traversed through different formations (shale, sand, sandy shale, limestone, marl, chalky shales, etc.) before reaching the formation containing hydrocarbons which must be taken to market. Usually the deposits where the hydrocarbons are located consist of carbonate rocks, sand and/or sandy shale, which by virtue of its permeability may allow such hydrocarbons to flow in a natural way by taking advantage of the existing pressures in deposits or well, released deposits requiring the use of secondary recovery techniques (gas lift, rod pump, electro centrifugal pump, etc.). Invariably, the hydrocarbons flow through the porous medium will depend greatly on both, insoluble particles of traditional drilling fluids that may have invaded these areas, causing, among other reasons, the clogging of the pores of the formation, and thus the reduction in the hydrocarbon production. Permeability is the ease with which the pores of the formation may allow for the free flow of fluid through them, which will depend greatly on both, that the pores are communicated with each other and that there are no foreign particles in the formation preventing or blocking the passage of fluids through it, this process of invasion or blocking of the pores of the formation is traditionally known as damage to the productive formation, same that is caused by the fluids used during the drilling, completing or repairing operations of oil wells.

The traditional solids-containing drilling fluids are generally insoluble solids in water and oil, same that, at the time of drilling, invade the productive formation causing clogging of the pores of the formation thereby reducing its permeability. The chemical nature of these solids (usually weighting agents as barite, ilmenite, galena, iron oxide, etc.) prevents them from being dissolved by the traditional treatment with 15% HCl, this causing irreversible damage to the permeability of the formation. Additionally, certain types of surfactants (preferably and for example emulsifiers, moisturizers and reducers of surface and interfacial strength) used in the formulation of drilling fluids, may interact with the formation fluids (water or crude oil) creating emulsions that are difficult to remove, as on one side, the created emulsions have high viscosities (characteristic of emulsions) and on the other, change the formation's wettability which prevents or restricts the flow of hydrocarbons through the pores of the productive formation.

In order to solve the concerns related to damages to the productive formation, fluids formulated based on solids-free heavy brines have been used, which have the advantage of not requiring insoluble solids (such as barite, calcium carbonate, iron oxide, galena, etc.) to increase the density required by high-pressure/high-temperature wells in order to control formation pressures, this type of fluid increases its density by dissolving salts or mixtures thereof (NaCl, KCl, $CaCl_2$, $CaBr_2$, $ZnBr_2$, $NaHCO_3$, NaBr, $KHCO_3$, $NaHCO_3$, $NH_4Cl$, etc.) in water, such that there are no insoluble solids (in suspension) which may, during the drilling of the productive area, invade the formation with the consequent plugging and reduction of the well's permeability and production. Table 1 shows the achievable density ranges with the most commonly used brine systems.

TABLE 1

Brines used as completing and repairing fluids.

| TYPE OF BRINE | DENSITY RANGE |
| --- | --- |
| KCl | 0.99-1.16 g/cm$^3$ |
| NaCl | 0.99-1.20 g/cm$^3$ |
| $NaHCO_2$ | 0.99-1.20 g/cm$^3$ |
| $CaCl_2$ | 0.99-1.39 g/cm$^3$ |
| $KHCO_2$ | 0.99-1.59 g/cm$^3$ |
| NaBr | 0.99-1.52 g/cm$^3$ |
| NaCl—NaBr | 1.20-1.52 g/cm$^3$ |
| $CaCl_2$—$CaBr_2$ | 1.39-1.81 g/cm$^3$ |
| $CaBr_2$ | 0.99-1.83 g/cm$^3$ |
| $CaCl_2$—$CaBr_2$—$ZnBr_2$ | 1.81-2.35 g/cm$^3$ |
| $CaBr_2$—$ZnBr_2$ | 1.70-2.52 g/cm$^3$ |

While this type of drilling fluid systems do not contain solids in suspension to increase the density, it is also true that they require additives in order to provide the required physicochemical properties for the drilling fluid to comply with its functions for drilling the productive area, i.e., mainly, viscosifying agents, reducers of filtrate loss (commonly called filtrate reducers), alkalizing agents, bridging agents, heat stabilizers, corrosion inhibitors, clay hydration inhibitors, acid gas sequestrants, corrosion inhibitors, etc.) are required, same that must be embedded in the solids-free brines.

Thus, in the prior art there are different systems for solids-free brines wherein the mentioned additives have been embedded. However, such systems face two major problems:

A) One is that when the required density is greater than 1.40 g/cc and there is the presence of divalent metal containing salts, the viscosifying polymers traditionally used have problems for being hydrated in water, this is mainly because most of the water is associated with salt and there is not enough free water for the polymer to be acceptable hydrated, requiring in some cases, the increasing of mixing times, combined with high shear speeds and/or supplying heat (temperature increases) to achieve viscosifying the brine and/or embed some filtrate reducer polymer, and B) Two, that the polymers traditionally used to increase the viscosity of the brine and/or to reduce the loss by filtration cannot withstand high temperatures (over 150° C. and 200° C.) required for the formations to be drilled, this arising from the fact that the deposits that are located at shallow depths, practically, no longer exist, and today have to drill ever deeper thereby increasing the downhole temperature, considering the geothermal gradient of the area.

In the prior art, there are different natural polymers that are used to viscosify brines, these are, among others, xanthan gum (biopolymer) and hydroxyethyl cellulose (HEC, polysaccharide)), however, both polymers have some problems for viscosifying heavy brines. HEC is a typical viscosifier used to viscosify brines, however, it requires heating for reaching the viscosities required when the densities are greater than 1.45 g/cc, further, HEC has stability problems when the downhole temperatures exceed 130 C. Similar behavior occurs when using Xanthan Gum for viscosifying brines containing divalent cations and especially when densities are greater than 1.45 g/cc (Patent WO 88/02/02434).

Further, there are other synthetic polymers in the prior art that have been used and proposed for viscosifying heavy brines, U.S. Pat. No. 4,490,261 discloses and claims a fluid for oil well drilling, which uses a polymer or N-heterocyclic copolymer such as poly vinyl pyridine in order to increase the viscosity at temperatures above 300° F. (148.9° C.), of a fluid containing a high titer of acid salts (zinc bromide) in order to be used for the drilling of the productive areas, claiming that said invention does not contain other polymeric thickeners such as starch, sodium carboxymethylcellulose, and modified polyacrylate.

U.S. Pat. No. 5,480,863, discloses and claims a composition comprising brine containing zinc bromide, a viscosifier acrylamide copolymer and 2-acrylamide-2-sodium methylpropanesulphonate and a dimethyl benzyl ammonium chloride surfactant. Wherein the copolymer, which is the only composition viscosifier, shows that same may be able to viscosify the heavy brines with densities up to 19.2 lb/gal (2.30 g/cc) but they require heating to develop their properties and their thermal resistance is limited to a range of 80 to 300° F. (26.66 to 148.88° C.).

It should be noted, considering the existence of high porosity productive formations, naturally fractured with cracks, fissures, caverns and/or microfractures, it is necessary to embed the drilling fluid of the present invention with bridging materials that help in controlling fluid losses into the formation, this, in order to minimize the invasion of the drilling fluid that could cause any damage to the permeability through any of the above listed mechanisms. These bridging agents consisting mainly of solid particles ($CaCO_3$, $MgCO_3$, etc.) that could subsequently be removed by the treatment with HCl or HF and which further have a particle size distribution appropriate to the size of the pore gorge and/or size of the fracture, fissure or cavern, the maximum size being of ⅓ the size of the pore gorge in order to contain the fluid flow into the productive formation.

OBJECTS OF THE INVENTION

Thus, one object of the present invention is to provide a composition, method of preparation and application of a drilling, completing and repairing fluid system of oil wells producing oil, gas and condensates, and more preferably, a clean solids-free fluid system based on calcium chloride, calcium bromide and/or zinc bromide brines to be used during the drilling operations of hydrocarbon productive areas (drilling, cementing, making electric logs, opening windows, Side track, string shot, fishing operations, re-deepening, etc.) and additionally to be used in completing and/or repairing operations of oil wells, significantly reducing the damage to the permeability of productive formations.

Another object of the invention is that the fluid system is formulated and prepared with polymeric agents resistant to temperatures higher than 200° C., and able to be hydrated without using long periods of stirring and heating at high shear speeds.

Further, another object of the invention is that the system, formulated with calcium chloride, calcium bromide and/or zinc bromide heavy brines, besides providing a good control of the rheological properties and filtration losses at temperatures higher than 180° C., provides good lubricating properties, inhibits the hydration of the clays present in the productive formation and resist common pollutions that occur during the drilling operations of the productive area and completing and repairing operations (pollution of acid gas, cement, congenital water and drill solids comprising sand, limestone, shale chalky and mixtures thereof).

Another object of the present invention is that the density of the system may be increased by adding water-soluble dry salts and/or by adding "Spike" fluids. "Spike" fluid meaning a brine of one or more high density salts that is used to increase the density of the fluid system in order to have a fast embedding into the system.

Another object of the invention is that the fluid system can be used for completing and repairing operations (re-deepening, milling, recovering of rigging and production packers, formation testing, recordings, production testing, stimulations, etc.) and more specifically as a mean for controlling the formation fluids and gas migration that occurs during completing and repairing operations in wells with temperatures up to 200° C.

Another object of the present invention is that the fluid system or composition contains an agent that prevents the formation of emulsions when said fluid is in contact with the productive formation fluids (hydrocarbons).

Finally, an object of the present invention is to significantly reduce the damage to the oil productive formation using the compound herein.

BRIEF DESCRIPTION OF THE DRAWINGS

The numerous features of the invention are particularly described in the appended claims. A better understanding of the features and advantages of the present invention will be obtained by reference to the following detailed description of illustrative embodiments, which use the principles of the invention, and the appended drawings, wherein:

Figure 1:
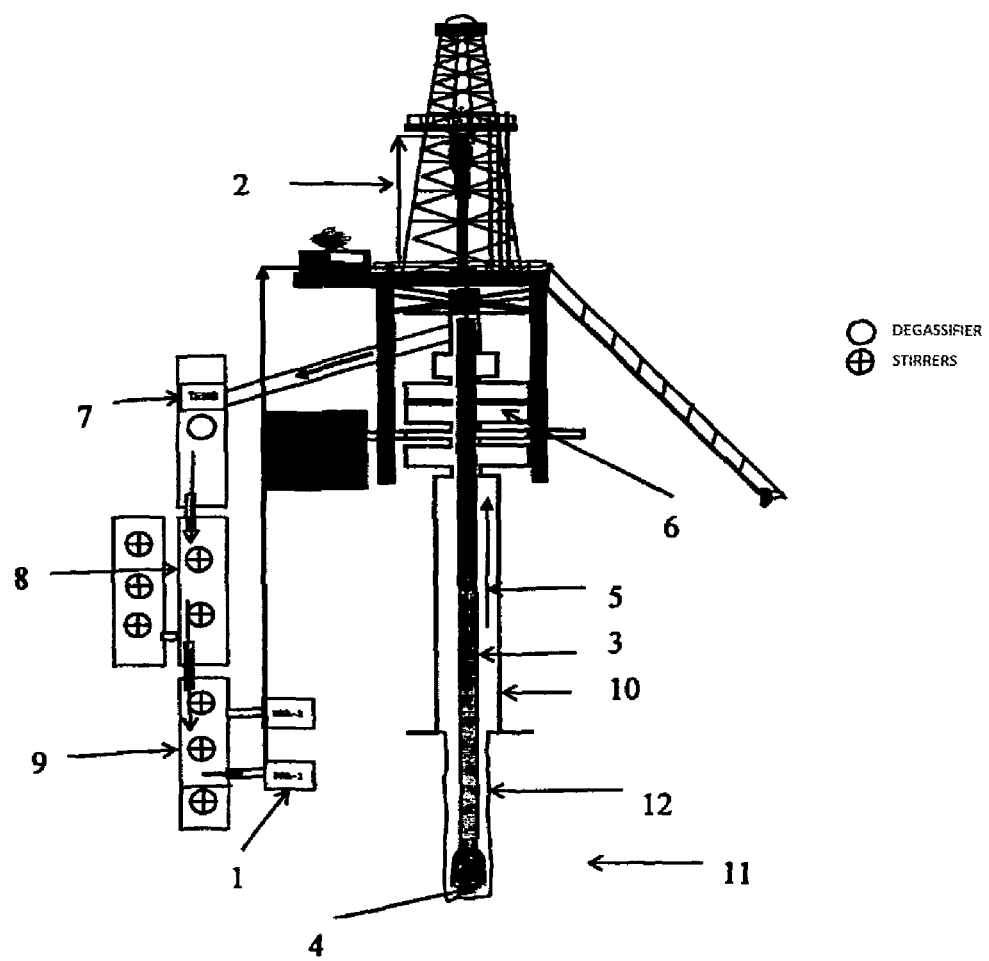
FIG. 1 shows a diagram of the circulatory system to drill/complete/repair the productive area with the Fluid System formulated with the composition object of this invention.
Figure 2:
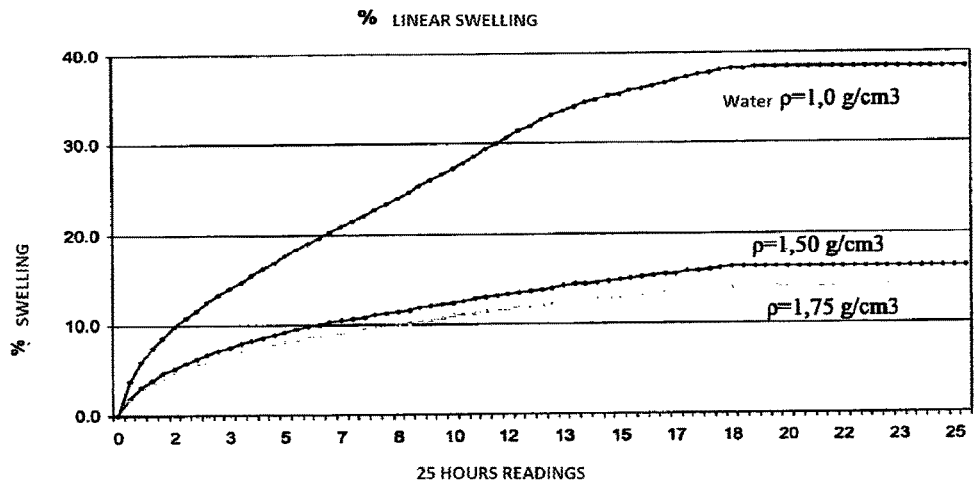
FIG. 2 shows the percentage of linear swelling of a shale sample with cation exchange capacity of 25 meq/100 g of clay when undergoing the effects of solids-free drilling fluid of the present invention with densities of 1.50 and 1.75 g/cc for compared with freshwater.

FIG. No. 3 shows the separation of crude oil of the solids-free drilling fluid system containing 10% 10° API light crude oil and 1% surfactant (demulsifier) after stirring and stored for 1 hour.

FIG. No. 4 shows the separation of crude oil of the solids-free drilling fluid system with a density of 1.50 g/cc, containing 10 vol % 10° API light crude oil and 1% surfactant (demulsifier) after rolling at 200° C. for 18 hours after stirring and stored for 1 hour.

FIG. No. 5 shows the % of recovery of the permeability of a 4-darcy permeability ceramic disc after the solids-free fluid system (prepared with a 1.45 g/cc density binary brine) underwent a filtration process at 150° C. and 500 psi differential pressure and a 15% HCL washing process.

DETAILED DESCRIPTION OF THE INVENTION

The present invention relates to a clean solids-free fluid system that can be used for drilling, completing and repairing of oil wells, however it may also be used for drilling productive formations and completing and repairing operations of hydrocarbons production wells (oil, gas and condensates).

The fluid system of the present invention is mainly built by a water-base fluid whose main components are a single or binary brine containing one or more water-soluble divalent metal salts, a synthetic polymer as viscosifying agent and filtrates reducer, a biopolymer as viscosifying agent and control of the suspension properties, an alkalizing agent for controlling pH and acid gas, a shale hydration and lubricating properties enhancing alkalizing agent, a bridging agent for controlling fluid losses, a mixture of surfactants designed to prevent the formation of emulsions and that may also contain a corrosion inhibitor agent.

The brines used may be simple or binary brines formed by a salt or mixture of divalent halide salts. Examples of these salts are calcium chloride, calcium bromide, zinc bromide or mixtures thereof and more preferably a binary mixture of calcium chloride and calcium bromide salts. According to the present invention, the titer of these salts may widely vary depending on the density of the wellbore fluid required for controlling the formation pressures. More specifically, the % weight of the salt or salt mixture may be up to 75% weight, and can range from 27 to 41 wt % $CaCl_2$, 1.6 to 30 weight % CaBr2 and from 11 to 52.8 wt % $ZnBr_2$ and more preferably from 1.0 to 37% $CaCl_2$ and 1 to 57% $CaBr_2$. The density of the brines may range from 1.03 to 1.80 g/cc or preferably 1.20 to 1.70 g/cc and even 2.20 g/cc. This brine may be prepared according to traditional methods existing in the prior art, i.e., it will suffice to add the salt or mixture thereof to the freshwater or drilling water and providing mechanical agitation to dissolve such salts under their high hygroscopic properties and high water solubility. The density of the brine, or the clean suspended solids-free fluid, can be adjusted by the addition of dry salts or using Spike fluids (high-density brines), which are normally kept on the fluids plant or in site. The brine object of this invention must be filtered using a filtration means which may be of diatomaceous earth or a cartridges filter, or any other filtration equipment of existing in the prior art, in order to reduce the suspended solids to a value from 0.1 to 2% and most preferably 0.05 to 1.5 wt % or having a turbidity of less than 25 NTU (Nephelometric Turbidity Units) measured with a turbidimeter in order to remove insoluble solids (impurities) accompanying salts.

The synthetic polymer of the invention is used as a viscosifying and filtrate reducer of divalent simple and binary brines and has the feature of not requiring prolonged stirring periods, heating or use of high shear rates to hydrate in the presence of high density divalent brines. This novel polymer also presents a thermal resistance higher than 200° C. and is used in a titer range of 1.0 to 40 kg/m3, and more preferably from 0.5 to 20 kg/m3, characterized in that it is a polymer of molecular formula (C8H16ClN) or (C6H14ClN)n, selected from the group of azacyclopenthane, azolidine, prolamin, tetramethylenediamine, tetrahydropyrrole, buthylenamine, pyrrolidine, piperidine or mixtures thereof and/or because the filtrate reducer viscosifier of the invention could also be derived from one or more of the following homopolymers: N,N-Dimethyl-N-2-Propenyl-2-propen amine, 2-propen-1-amine N—N-dimethyl-N-2 propenyl chloride, dimethyl diallyl ammonium chloride, and more specifically because its generalized structural formula may be one or both of the following:

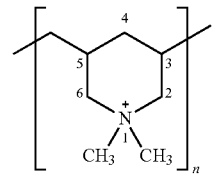

A

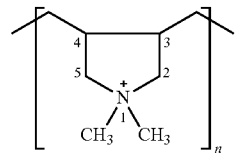

B

The viscosifier biopolymer employed in the present invention must be handled jointly with the synthetic polymer, as both have a synergistic effect which makes the biopolymer to increase its thermal resistance values higher than 200° C., and to provide the suspending properties required by the fluid system to carry and support the drill cuttings in order to maintain the downhole clean. The biopolymer increases the viscosity and improves the suspension capacity of divalent cation single and binary brines and is used in a titer ranging from 1.5 to 45 kg/m³, preferably in a titer of 1.0 to 25 kg/m³. Preferably, the polymer used according to the present invention may be selected from the group consisting of alginate, anionic polysaccharides, gellan gum, guar gum, Gatti gum, karaya gum, welan gum, tragacanth gum, xanthan gum, Arabic gum, acacia gum and sodium hydroxyethylcellulose and mixtures thereof, and more preferably the biopolymer is selected from the group of *Xanthomonas* gums which are made by carbohydrates fermentation with *Xanthomonas* generic bacteria, which may be one or more of the group of *Xanthomonas, phaseoli, Xanthomonas mulvacearn, Xanthomonas campestris, Xanthomonas carotoe* and *Xanthomonas translucean*. The gum produced by the *Xantomona Campestri* is preferred for the purposes of the present invention.

The alkalizing agent main function is to modify and maintain the pH of the composition in alkaline values in order to minimize corrosion and counteract the acid gases. The pH should be maintained between 6.0 and 10.5, and more preferably between 6.5 and 9.5. The titer range of the alkalizing agent can vary, depending on the mixture of salts, and on the titer and type of acid gases that the productive formation may provide, and more preferably, the titer range may be from 1.0 to 15.0 kg/m$^3$, and more specifically from 0.20 to 5.0 kg/m$^3$, or the amount necessary for the adjustment of the pH to the required values. The alkalizing agent may be selected from the group of $MgCO_3$, CaO, $Ca(OH)_2$, NaOH, KOH, MgO, $MgOH_2$, $NH_4OH$, $C_2H_7NO$, $C_4H_{11}NO_2$, or mixtures thereof.

The inhibitor agent of the hydration of swellable shales and lubrication enhancer of the system object of this invention is used in a titer range of 1 to 40 l/m$^3$, however it is preferable to use a titer of 4.0 to 20.0 kg/m$^3$ or more specifically it is used at a titer according to the activity (ability to swell in fresh water) that the clays present in the formation show. It is therefore desirable to perform linear swell testing (fluid-rock interaction testing) submitting samples of the channel formation being drilled with the fluid system object of this invention, which further contains the aforementioned additives containing several titers of the subject hydration inhibitor agent, the swelling of the formation must be less than 25% in a 22 hrs period. (This test is well known to all those who are engaged in the state of the art of drilling fluids of oil wells). The hydration inhibitor agent is selected from the group of PHPA, polyvinylpyrrolidone, aliphatic polyamines, calcium hydroxide, aluminum and magnesium hydroxide salts mixture (MMH), KCl, $CaCl_2$, $CaBr_2$, NaCl, quaternary amines derived fatty acids, Mono ethanol amine, di ethanol amine, Tri ethanol amine, poly hydric alcohols, glycol ethers, Mono ethylene glycol, diethylene glycol, tri ethylene glycol, poly ethylene glycol, propylene glycol, poly propylene glycol or mixtures thereof, and most preferably the hydration inhibitor agent is a polyol characterized in that it is a mixture of glycols and polyglycols which average molecular weight range varies from 400 g/mole to 6000 g/mol, however, the preferred range varies from 400 grams/mol 1200 grams/mole, or more preferably from 1200 g/mol to 5000 g/mol and its composition has the following structural chemical formula:

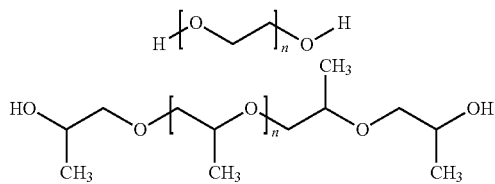

The bridging agent used in the composition of the system object of this invention is used in a titer from 0.5 to 150 kg/m$^3$, and more preferably from 1.0 to 100 kg/m$^3$, and it must be selected from the group of MgO, MnO, CaO, CuO, ZnO, $MgCO_3$, $CaCO_3$, $ZnCO_3$, $Ca(OH)_2$, $Mn(OH)_2$, nutshell, coconut shell, cellulose fibers and insoluble resins or mixtures thereof. The preferred bridging agent may be any of the aforementioned materials which is water soluble but HCl insoluble, so the preferred materials are $CaCO_3$ or a mixture of $CaCO_3$ and $MgCO_3$ and more preferably marble derived-high purity $CaCO_3$ crushed in a special way to obtain a particle size distribution suitable for sealing the productive formation, wherein the particle size distribution must meet the Maximum Density Theory of Furnas and because it has a purity of 90 to 99.5%. The maximum particle size must be selected according to the poral gorge size and more specifically must be of ⅓ the size of the pore formation being drilled, however the particle size can vary from 1 to 2500 microns or from 1-74 microns or alternatively from 150 to 2360 microns depending on the pore size of the productive formation being drilled with the fluid system of the present invention.

The solids-free drilling fluid system of the present invention also has an embedded surfactant (demulsifier) whose main function is to prevent the formation of emulsions that could be formed when contacting the fluid of the present invention with the hydrocarbons formation, which may damage the permeability. The surfactant is used in a titer ranging from 1 to 5% vol. However, it may also be handled in a titer ranging from 25 to 250 ppm and more preferably in a titer from 0.005 to 2% vol. The surfactant used in the present invention may be selected from the group of nonylphenol ethoxylated with a high degree of ethoxylation, phenolic and oxy alkylated sulfonated resins (TRETOLITEDM046X) isopropylamine dodecyl benzene sulfonate (WITCONATE 93s) alcoxy ethylated epoxy resins (DEMTROL 300) and mixtures thereof.

An important feature of the present invention, the inventors have learned that when mixing the synthetic polymer with the *Xanthomonas campestris* derived biopolymer, a synergistic effect occurs which causes the latter to increase its thermal resistance from 120° C. to values higher than 200° C. The synergistic effect occurs considering that the synthetic polymer of the present invention has a thermal resistance higher than 200° C. and that when mixing same, within divalent cation single or binary brines, with the *Xanthomonas campestris*-derived biopolymer increases the thermal stability of the biopolymer from 120° C. to values higher than 200° C., to achieve this synergistic effect, the biopolymer must be mixed in a ratio of 1:4 parts by weight, or preferably a ratio of 1:1 or more preferably in a ratio of 1:2.5 or 0.40:1 parts by weight respectively (so far the exact mechanism under which this synergistic effect occurs is unknown).

The composition comprising the drilling, completing and repairing fluid system of the present invention does not require special equipment for its preparation, both in the field and in laboratory and any person skilled in the art of drilling fluids and more precisely of divalent metal single or binary brines, may prepare the order of addition shown in the following typical formulation.

TABLE 2

TYPICAL FORMULATION

| ADDITIVE | TITER |
|---|---|
| BRINE $CaCl_2$, or $CaCl_2$—$CaBr_2$, m$^3$ | 1.0 |
| PROTEX-BUFFER, kg/m$^3$ | 3-6 |
| BIOPOLYMER 1, kg/m$^3$ | 10-20 |
| SYNTHETIC POLYMER, kg/m$^3$ | 4-15 |
| BRIDGING AGENT, kg/m$^3$ | 10-20 |
| SHALES INHIBITOR, l/m3 | 5-20 |
| DEMULSIFIER, l/m$^3$ | 0.05-20 |

For the specific case of its preparation in the laboratory, it is only required a special vessel (e.g., 2 liter stainless steel jug), high-speed mixer (e.g., model 9B double propeller Hamilton Beach), pH meter, a beam balance and different capacities test-tubes.

In order to prepare the composition at the field level only the mixing dams enabled with mechanical agitators, mixing funnel and centrifugal pumps are required.

As seen in FIG. 1, there is a well circulatory circuit diagram drilling the producing zone, the prepared fluid is circulated with a mud pump (1) through a vertical pipe (2), a drill string (3), and tailspin (4) that reaches the formation (11) by the open bore (12) in order to return through an annular space (5) via a casing pipe (10). Then, the exits the well through a blow preventer (BOP) (6) to be sent to a solids control equipment (7) where the drill cuttings are separated and the fluid is returned to the mixing (8) and suction (9) tank to be circulated again into the well.

For both cases, preparation at laboratory or at field, the fluid is prepared with a density according to the requirements of the well, this is, with a density enough for the hydrostatic column pressure within the well to be sufficient to counteract the fluids present in the formation to be drilled, for such effects, the brine should be selected taking into consideration the brines shown in Table 1 and adding the amounts of additives in an amount sufficient (as shown in Table #2) for the fluid to show physicochemical and hydraulic properties required for the formation to be drilled (rheology, filtrate loss, lubricity, shale hydration inhibition, etc.) significantly reducing the drilled formation damages.

A novel aspect of the composition of the present invention is that it does not only achieve to viscosity divalent metal single or binary brines with densities higher than 1.40 g/cc to 2.20 g/cc without resorting to longer mixing periods, high shear speeds and heating to cause the hydration of the polymer(s), but further, the polymers used cause that the composition increases its thermal resistance values higher than 200° C., which makes it suitable for drilling/completing/repairing high pressure and high temperature wells.

Another novel aspect is that the composition contains three different inhibitors of clays hydration (single or binary brines, synthetic polymers and biopolymers and the hydration inhibitor), which ensures a selective-like inhibition that causes that the clays present in the poral gorge of the productive formation to not hydrate when these contact the liquid phase of the composition of the present invention that invades the formation during drilling thereof.

Another further object of the present invention is that the composition also contains a surfactant that inhibits the formation of crude oil-brine emulsion which significantly reduces the damage to the permeability of the productive formation.

An advantageous aspect of the composition of the present invention with respect to the traditionally used fluids during the drilling of the productive area, is that it was specially designed for the additives comprising it, besides withstanding temperatures exceeding 200° C., to have lubrication rates lower than those of traditional water-based systems (0.20 to 0.25) and to inhibit the hydration of the clays present in the productive formation, also resist the pollution of seawater flows, acid gases such as $CO_2$ and $H_2S$, crude oil and drill cuttings, among others.

APPLICATION EXAMPLES

The application examples shown in tables No. 1 to No. 17, which depict the preparation and performance of the Solids-Free Drilling Fluid System object of this invention, as well as the performance increasing and reducing the titer thereof. Further, evidence is of theological behavior, filtration losses and thermal resistance when undergoing different temperatures and the action of the most common pollutants found when drilling the productive area and permeability return tests.

Example No. 1

Table No. 3 shows the viscosifying process of a brine of $CaCl_2$—$CaBr_2$ with a density of 1.60 g/cc using a xanthan gum biopolymer with a titer of 20 kg/m³ at different stirring times, using a model 9B double propeller HB mixer.

TABLE NO. 3

| Concept | Stirring Time | | | | | | |
|---|---|---|---|---|---|---|---|
| | 0 | 1 | 2 | 3 | 4 | 5 | 6 |
| Polipro XC | 20 kg/m³ | 20 kg/m³ | 20 kg/m³ | 20 kg/m³ | 20 kg/m³ | 20 kg/m³ | 20 kg/m³ |
| Brine weight, (g/cm3) | 1.60 | 1.60 | 1.60 | 1.60 | 1.60 | 1.60 | 1.60 |
| Bulk viscosity (cP) | 11 | 13 | 14 | 18 | 28 | 42 | 55 |
| Plastic Viscosity (cP) | 11 | 13 | 14 | 17 | 25 | 33 | 45 |
| Yield (lb/100 ft²) | 0 | 0 | 0 | 2 | 6 | 18 | 20 |
| L600 (lb/100 ft²) | 22 | 26 | 28 | 36 | 56 | 84 | 110 |
| L300, (lb/100 ft²) | 11 | 13 | 14 | 19 | 31 | 51 | 65 |
| L100, (lb/100 ft²) | 5 | 5 | 6 | 8 | 13 | 18 | 26 |
| L6, (lb/100 ft²) | 2 | 2 | 2 | 2 | 3 | 3 | 4 |
| L3, (lb/100 ft²) | 1 | 1 | 1 | 1 | 2 | 2 | 2 |

The results show the difficulty of normal biopolymers such as xanthan gum to viscosify brines with densities greater than 1.40 g/cc, as in this case 6 hours of stirring with a high shear speed (16,000 rpm) using an 9B model double propeller HB type mixer in order to cause that the polymer hydrates. It must be noted that, due to the prolonged time and high shear speed, the brine temperature increased to 60° C., which also contributed to the hydration process of the polymer.

Example No. 2

Table No 4 shows the viscosifying process of a brine of $CaCl_2$—$CaBr_2$ with a density of 1.60 g/cc using a cellulosic-like polymer (Sodium Hydroxyethyl Cellulose) in liquid with a titer of 47.6 kg/m³ at different stirring times, using a 9B model double propeller HB mixer.

TABLE NO. 4

| Concept | Stirring Time (min) | | | Stirring Time (hrs) | | |
|---|---|---|---|---|---|---|
| | 3 | 10 | 30 | 1 | 2 | 3 |
| HEC Titer | 47.6 l/m³ | 47.6 l/m³ | 47.6 l/m³ | 47.6 l/m³ | 47.6 l/m³ | 47.6 l/m³ |
| Brine weight, (g/cm3) | 1.60 | 1.60 | 1.60 | 1.60 | 1.60 | 1.60 |
| Bulk viscosity (cP) | 13 | 13 | 11 | 10 | 12.5 | 25 |
| Plastic Viscosity (cP) | 13 | 13 | 11 | 10 | 12 | 25 |
| Yield (lb/100 ft²) | 0 | 0 | 0 | 0 | 1 | 0 |
| L600 (lb/100 ft²) | 26 | 26 | 22 | 20 | 25 | 50 |
| L300, (lb/100 ft²) | 13 | 13 | 11 | 10 | 13 | 25 |
| L100, (lb/100 ft²) | 4 | 4 | 3 | 3 | 4 | 9 |
| L6, (lb/100 ft²) | 1 | 0 | 0 | 0 | 0 | 0 |
| L3, (lb/100 ft²) | 0 | 0 | 0 | 0 | 0 | 0 |

The results also show the difficulty of the Sodium hydroxyethylcellulose (HEC)-type polymers to viscosify brines with densities higher than 1.40 g/cc, as in this case 3 hours of stirring with a high shear speed (16,000 rpm) using a model 9B double propeller HB-type mixer in order to achieve the hydration of the polymer, notwithstanding the fact that the presentation of this polymer is liquid in order to improve its hydration process. It should be mentioned that due to the prolonged time and the high shear speed, the brine temperature increased to 55° C., which also contributed to the hydration process of the polymer.

Example No. 3

Table No. 5 shows the thermal stability of the Xanthan Gum and Sodium Hydroxyethyl when undergoing a rolling process at 150° C. for 18 hours, both samples were prepared using a brine of $CaCl_2$—$CaBr_2$ to which, during stirring in a model 9B dual propeller Hamilton Beach, at medium speed, the polymer was added and stirred for the time needed to hydrate the polymers, then the pH was adjusted by adding 4.0 kg/m³ of alkalizing agent.

TABLE NO. 5

| | Concept | | | |
|---|---|---|---|---|
| | Before Rolling (Polipro XC) | After Rolling for 18 hrs at 150° C. (Polipro XC) | Before Rolling (HEC) | After Rolling for 18 hrs at 150° C. (HEC) |
| Polymer Titer, kg/m3 | 20 | 20 | 7 | 7 |
| Brine weight, (g/cm3) | 1.7 | 1.7 | 1.65 | 1.65 |
| Bulk viscosity (cP) | 57 | 1.5 | 60 | 37 |
| Plastic Viscosity (cP) | 28 | 1 | 40 | 35 |

TABLE NO. 5-continued

| | Concept | | | |
|---|---|---|---|---|
| | Before Rolling (Polipro XC) | After Rolling for 18 hrs at 150° C. (Polipro XC) | Before Rolling (HEC) | After Rolling for 18 hrs at 150° C. (HEC) |
| Yield (lb/100 ft²) | 58 | 1 | 40 | 4 |
| L600 (lb/100 ft²) | 114 | 3 | 120 | 74 |
| L300, (lb/100 ft²) | 86 | 2 | 80 | 39 |
| L100, (lb/100 ft²) | 54 | 1 | 41 | 13 |

TABLE NO. 5-continued

| | Concept | | | |
|---|---|---|---|---|
| | Before Rolling (Polipro XC) | After Rolling for 18 hrs at 150° C. (Polipro XC) | Before Rolling (HEC) | After Rolling for 18 hrs at 150° C. (HEC) |
| L6, (lb/100 ft²) | 23 | 0 | 5 | 0 |
| L3, (lb/100 ft²) | 17 | 0 | 3 | 0 |

The results show the lack of thermal stability that contains both the Xanthan Gum as well as the Sodium Hydroxyethylcellulose, since after rolling the viscosified fluid, the rheological properties were drastically reduced.

Example No. 4

Tables Nos. 6, 7 and 8 show the rheological properties and of filtrate loss from a brine of $CaCl_2$ with a density of 1.38 g/cc, another of $CaCl_2$—$CaBr_2$ with a density of 1.50 g/cc and another one of $CaCl_2$—$CaBr_2$ with a density of 1.65 g/cc treated with various titers of the synthetic polymer of the invention. The cited fluids were prepared as follows: $CaCl_2$ brine was stirred using a model 9B dual propeller HB mixer employing at medium speed (16,000 rpm) and the synthetic polymer of the invention was added, the pH was adjusted by adding an alkalizing agent at a titer of 5 kg/m³ and the stirring was continued for 30 minutes more. The fluid titer of 20.0 kg/m³ of the synthetic polymer underwent a rolling process at 180° C. for 18 hours in order to determine the thermal resistance of the fluids.

TABLE NO. 6

Calcium Chloride Brine with a density of 1.38 g/cc, viscosified with synthetic polymer.

| Formulation | Before rolling, 30 min HB, medium speed | | | | After rolling, 18 hrs at 180° C. |
|---|---|---|---|---|---|
| Brine (cm3) | 400 | 400 | 400 | 400 | 400 |
| Alkalizing (kg/m3) | 0 | 5 | 5 | 5 | 5 |
| Viscosifier (kg/m3) | 0 | 10 | 15 | 20 | 20 |
| Density (g/cm3) | 1.38 | 1.38 | 1.38 | 1.38 | 1.38 |
| L600 (lb/100 ft2) | 14 | 38 | 53 | 74 | 76 |
| L300 (lb/100 ft2) | 8 | 20 | 30 | 42 | 43 |
| L200 (lb/100 ft2) | 5 | 14 | 21 | 30 | 29 |
| L100 (lb/100 ft2) | 3 | 8 | 12 | 16 | 15 |
| L6 (lb/100 ft2) | 1 | 2 | 2 | 2 | 2 |
| L3 (lb/100 ft2) | 0 | 1 | 1 | 1 | 1 |
| Bulk Viscosity (cP) | 7 | 19 | 26.5 | 37 | 38 |
| Plastic Viscosity (cP) | 6 | 18 | 23 | 32 | 33 |
| Yield (lb/100 ft2) | 2 | 2 | 7 | 10 | 10 |
| pH | — | 10.11 | 10.31 | 10.34 | 9.65 |
| $F_{API}$ (cm3) | — | — | 15.1 | 16.2 | 17.4 |

TABLE NO. 7

Calcium Chloride - Calcium Bromide Brine with a density of 1.50 g/cc, viscosified with synthetic polymer.

| Formulation | Before rolling, 30 min HB, medium speed | | | | After rolling, 18 hrs at 180° C. |
|---|---|---|---|---|---|
| Brine (cm3) | 400 | 400 | 400 | 400 | 400 |
| Alkalizing (kg/m3) | 0 | 5 | 5 | 5 | 5 |
| Viscosifier (kg/m3) | 0 | 10 | 15 | 20 | 20 |
| Density (g/cm3) | 1.5 | 1.5 | 1.5 | 1.5 | 1.5 |
| L600 (lb/100 ft2) | 15 | 41 | 63 | 91 | 92 |
| L300 (lb/100 ft2) | 9 | 22 | 36 | 51 | 51 |
| L200 (lb/100 ft2) | 6 | 16 | 26 | 34 | 36 |
| L100 (lb/100 ft2) | 4 | 9 | 14 | 22 | 19 |
| L6 (lb/100 ft2) | 2 | 2 | 2 | 3 | 3 |
| L3 (lb/100 ft2) | 1 | 1 | 1 | 2 | 2 |
| Bulk Viscosity (cP) | 7.5 | 20.5 | 31.5 | 35.5 | 46 |
| Plastic Viscosity (cP) | 6 | 19 | 27 | 40 | 41 |
| Yield (lb/100 ft2) | 3 | 3 | 9 | 11 | 10 |
| pH | — | 9.05 | 9.11 | 9.14 | 8.93 |
| $F_{API}$ (cm3) | — | — | 25.1 | 27.3 | 28.6 |

TABLE NO. 8

Calcium Chloride - Calcium Bromide Brine with a density of 1.65 g/cc, viscosified with synthetic polymer.

| Formulation | Before rolling, 30 min HB, medium speed | | | | After rolling, 18 hrs at 180° C. |
|---|---|---|---|---|---|
| Brine (cm3) | 400 | 400 | 400 | 400 | 400 |
| Alkalizing (kg/m3) | 0 | 5 | 5 | 5 | 5 |
| Viscosifier (kg/m3) | 0 | 10 | 15 | 20 | 20 |
| Density (g/cm3) | 1.65 | 1.65 | 1.65 | 1.65 | 1.65 |
| L600 (lb/100 ft2) | 16 | 56 | 96 | 106 | 101 |
| L300 (lb/100 ft2) | 9 | 31 | 55 | 59 | 56 |
| L200 (lb/100 ft2) | 6 | 21 | 39 | 38 | 43 |
| L100 (lb/100 ft2) | 4 | 14 | 22 | 21 | 30 |
| L6 (lb/100 ft2) | 2 | 2 | 2 | 3 | 3 |
| L3 (lb/100 ft2) | 1 | 1 | 1 | 2 | 2 |
| Bulk Viscosity (cP) | 8 | 28 | 48 | 53 | 50.5 |
| Plastic Viscosity (cP) | 7 | 25 | 41 | 47 | 45 |
| Yield (lb/100 ft2) | 2 | 6 | 14 | 12 | 11 |
| pH | — | 8.28 | 8.49 | 8.51 | 7.94 |
| $F_{API}$ (cm3) | — | — | 26.3 | 28.1 | 32.3 |

The results of Tables 6, 7 and 8 show that the synthetic polymer of the invention does not require extensive time, high shearing speeds and temperatures for hydration in brines simple $CaCl_2$ and binary $CaCl_2$—$CaBr_2$ brines with densities above 1.40 g/cc, since they were stirred for 30 minutes and the polymer fully developed the viscosity according to the titer used in each test Moreover, the results also show that the polymer withstands temperatures of 180° C. as after rolling for 18 hours, the viscosity was not affected, which leads us to conclude that the thermal stability is greater than 180° C.

Example No. 5

Tables No. 9, 10 and 11 show the rheological properties and filtrate loss from a brine of $CaCl_2$ with a density of 1.38 g/cc, one of $CaCl_2$—$CaBr_2$ with a density of 1.50 g/cc and another one of $CaCl_2$—$CaBr_2$ with a density of 1.65 g/cc polluted with plaster ($CaSO_4.2H_2O$), 10° API heavy crude oil and carbon dioxide ($CO_2$) after rolling at 180° C. for 18 hours.

The subject fluids were prepared in the following way: the brine was stirred using a model 9B dual propeller HB mixer at medium speed (16,000 rpm) and 20 kg/m3 of the synthetic polymer of the invention were added, the pH was adjusted by adding the alkalizing agent at a titer of 5 kg/m³ and stirring was continued for 30 minutes. The fluid so prepared underwent a rolling process at 180° C. for 18 hours in order to determine the thermal resistance of the fluid under the influence of the above pollutants.

TABLE NO. 9

Calcium Chloride Brine with a density of 1:38 g/cc, viscosified with synthetic polymer, polluted with plaster, crude oil and $CO_2$ and rolled at 180° C. for 18 hrs.

| Formulation | After Rolling at 180° C. for 18 hrs | | | | |
|---|---|---|---|---|---|
| | With no rolling | Rolled | Polluted w/30 kg/cm3 plaster | Polluted w/30 l/m3 crude oil | Polluted w/200 psi $CO_2$ |
| Brine (cm3) | 400 | 400 | 400 | 400 | 400 |
| Alkalizing (kg/m3) | 5 | 5 | 5 | 5 | 5 |
| Viscosifier (kg/m3) | 20 | 20 | 20 | 20 | 20 |
| Density (g/cm3) | 1.38 | 1.38 | 1.38 | 1.38 | 1.38 |

TABLE NO. 9-continued

Calcium Chloride Brine with a density of 1:38 g/cc, viscosified with synthetic polymer, polluted with plaster, crude oil and $CO_2$ and rolled at 180° C. for 18 hrs.

| | After Rolling at 180° C. for 18 hrs | | | | |
|---|---|---|---|---|---|
| Formulation | With no rolling | Rolled | Polluted w/30 kg/cm$_3$ plaster | Polluted w/30 l/m$_3$ crude oil | Polluted w/200 psi $CO_2$ |
| L600 (lb/100 ft2) | 74 | 76 | 81 | 84 | 45 |
| L300 (lb/100 ft2) | 42 | 43 | 45 | 47 | 24 |
| L200 (lb/100 ft2) | 30 | 29 | 32 | 32 | 16 |
| L100 (lb/100 ft2) | 16 | 15 | 18 | 17 | 8 |
| L6 (lb/100 ft2) | 2 | 2 | 2 | 2 | 1 |
| L3 (lb/100 ft2) | 1 | 1 | 1 | 1 | 1 |
| Bulk Viscosity (cP) | 37 | 38 | 40.5 | 42 | 22.5 |
| Plastic Viscosity (cP) | 32 | 33 | 36 | 37 | 21 |
| Yield (lb/100 ft2) | 10 | 10 | 9 | 10 | 3 |
| pH | 10.34 | 9.65 | 9.69 | 8.58 | 8.95 |
| F$_{API}$ (cm3) | 16.2 | 17.4 | 42.2 | 45.8 | 52 |

TABLE NO. 10

Calcium Chloride - Calcium Bromide Brine with a density of 1:50 g/cc, viscosified with synthetic polymer, polluted with plaster, crude oil and $CO_2$ and rolled at 180° C. for 18 hrs.

| | After Rolling at 180° C. for 18 hrs | | | | |
|---|---|---|---|---|---|
| Formulation | With no rolling | Rolled | Polluted w/30 kg/cm$_3$ plaster | Polluted w/30 l/m$_3$ crude oil | Polluted w/200 psi $CO_2$ |
| Brine (cm3) | 400 | 400 | 400 | 400 | 400 |
| Alkalizing (kg/m3) | 5 | 5 | 5 | 5 | 5 |
| Viscosifier (kg/m3) | 20 | 20 | 20 | 20 | 20 |
| Density (g/cm3) | 1.5 | 1.5 | 1.5 | 1.5 | 1.5 |
| L600 (lb/100 ft2) | 91 | 92 | 101 | 105 | 52 |
| L300 (lb/100 ft2) | 51 | 51 | 53 | 56 | 27 |
| L200 (lb/100 ft2) | 34 | 36 | 37 | 41 | 19 |
| L100 (lb/100 ft2) | 22 | 19 | 21 | 22 | 10 |
| L6 (lb/100 ft2) | 3 | 3 | 3 | 3 | 1 |
| L3 (lb/100 ft2) | 2 | 2 | 2 | 2 | 0 |
| Bulk Viscosity (cP) | 45.5 | 46 | 50.5 | 52.5 | 26 |
| Plastic Viscosity (cP) | 40 | 41 | 48 | 49 | 25 |
| Yield (lb/100 ft2) | 11 | 10 | 5 | 7 | 2 |
| pH | 9.14 | 8.93 | 8.82 | 8.26 | 9.02 |
| F$_{API}$ (cm3) | 27.3 | 28.6 | 32.5 | 45.7 | 63 |

TABLE NO. 11

Calcium Chloride - Calcium Bromide Brine with a density of 1.65 g/cc, viscosified with synthetic polymer, polluted with plaster, crude oil and $CO_2$ and rolled at 180° C. for 18 hrs.

| | After Rolling at 180° C. for 18 hrs | | | | |
|---|---|---|---|---|---|
| Formulation | With no rolling | Rolled | Polluted w/30 kg/cm$_3$ plaster | Polluted w/30 l/m$_3$ crude oil | Polluted w/200 psi $CO_2$ |
| Brine (cm3) | 400 | 400 | 400 | 400 | 400 |
| Alkalizing (kg/m3) | 5 | 5 | 5 | 5 | 5 |
| Viscosifier (kg/m3) | 20 | 20 | 20 | 20 | 20 |
| Density (g/cm3) | 1.65 | 1.65 | 1.65 | 1.65 | 1.65 |
| L600 (lb/100 ft2) | 106 | 101 | 102 | 119 | 64 |
| L300 (lb/100 ft2) | 59 | 56 | 61 | 71 | 35 |
| L200 (lb/100 ft2) | 38 | 43 | 46 | 51 | 24 |
| L100 (lb/100 ft2) | 21 | 30 | 23 | 28 | 13 |
| L6 (lb/100 ft2) | 3 | 3 | 3 | 3 | 2 |
| L3 (lb/100 ft2) | 2 | 2 | 2 | 2 | 1 |
| Bulk Viscosity (cP) | 53 | 50.5 | 51 | 59.5 | 32 |
| Plastic Viscosity (cP) | 47 | 45 | 41 | 48 | 29 |
| Yield (lb/100 ft2) | 12 | 11 | 20 | 23 | 6 |
| pH | 8.51 | 7.94 | 8.07 | 7.16 | 8.11 |
| F$_{API}$ (cm3) | 28.1 | 32.3 | 41.6 | 47.3 | 18.5 |

The results in Tables 9, 10 and 11 show that the $CaCl_2$ and $CaCl_2$—$CaBr_2$ simple and binary brine fluids, viscosified with the synthetic polymer of the invention resist the pollution they underwent, even under high temperature conditions, as the rheological properties were not reduced by the presence of the pollutant.

Example No. 6

Tables No. 12 and 13 show the high thermal stability, rheological behavior, filtrate loss at high and low pressure-high temperature, lubricating properties, ability to inhibit shale swelling and Marsh funnel viscosity of the solids-free fluid system object of the present invention prepared with $CaCl_2$—$CaBr_2$ binary brines with densities of 1.50 and 1.75 g/cc. The cited fluid system was prepared in such a manner similar to the one shown in example No. 4 stirring in model 9B double propeller HB, at medium speed (16,000 rpm) for 5 minutes between the additions of each of the components and finally amounting a time of 30 minutes to complete the integration and homogenization. The order of addition of the components of the system is the same as shown in tables Nos. 12 and 13. The methods of analysis of the rheological properties, filtrate loss at high pressure-high temperature and Marsh funnel viscosity were performed according to the procedures outlined in API RP 13 B1 of the American Oil Institute, and the methods of determining the lubricity and linear swelling rate (see FIG. No. 2) were performed according to the Official Mexican Standard NMX-L-187-SCFI-2004 (Oil Exploration—Shale Inhibitor Water Based Systems Used in Oil Well Drilling—Specifications and Test Methods).

TABLE NO. 12

Thermal Stability and rheological and filtration behavior of the Solids-Free Drilling Fluid System object of the present invention prepared with a $CaCl_2$—$CaBr_2$ binary brine with a density of 1.50 g/cc before and after rolling at 180° C. for 18 hours.

| CONCEPT | BEFORE ROLLING | | | | | After Rolling at 180° C., 18 hrs |
|---|---|---|---|---|---|---|
| Brine Density (g/cm3) | 1.50 | 1.50 | 1.50 | 1.50 | 1.50 | 1.50 |
| Alkalizing Agent, kg/m3 | 4 | 5 | 4 | 4 | 5 | 5 |
| Polipro XC Biopolymer, kg/m3 | 0 | 15 | 8 | 12 | 15 | 15 |
| Protec Vis Synth. Polym., kg/m3 | 10 | 20 | 10 | 15 | 20 | 20 |
| Bridging Agent, kg/m3 | 10 | 20 | 10 | 15 | 20 | 20 |
| Inhibishale Shale Inhibitor, l/m3 | 10 | 10 | 10 | 10 | 10 | 10 |
| Bulk Density (cP) | 32.0 | 34.5 | 34.5 | 46.5 | 57.5 | 47.0 |
| Plastic Viscosity (cP) | 27 | 27 | 26 | 37 | 47 | 38 |
| Yield (lb/100 ft2) | 10 | 15 | 17 | 19 | 21 | 18 |
| L600 (lb/100 ft2) | 64 | 69 | 69 | 93 | 115 | 94 |
| L300 (lb/100 ft2) | 37 | 42 | 43 | 56 | 68 | 56 |
| L200 (lb/100 ft2) | 26 | 30 | 30 | 41 | 50 | 44 |
| L100 (lb/100 ft2) | 14 | 17 | 17 | 24 | 30 | 22 |
| L6 (lb/100 ft2) | 2 | 3 | 3 | 4 | 5 | 3 |
| L3 (lb/100 ft2) | 1 | 2 | 2 | 3 | 4 | 2 |
| pH | 8.14 | 8.04 | 7.53 | 7.33 | 7.09 | 6.12 |
| API Filtrate (cm3) | | | | | 1.50 | 1.50 |
| APAT Filtrate (cm3) | | | | | 4.0 | 4.0 |
| Lubricity rate | | | | | 0.073 | |
| % Linear Swelling | | | | | 16.13 | |
| Marsh Viscosity (sec) | | | | | 115 | |

TABLE NO. 13

Thermal Stability and rheological and filtration behavior of the Solids-Free Drilling Fluid System object of the present invention prepared in $CaCl_2$—$CaBr_2$ binary brine with a density of 1.75 g/cc before and after rolling at 180° C. for 18 hours.

| CONCEPT | BEFORE ROLLING | | | | | After Rolling at 180° C., 18 hrs |
|---|---|---|---|---|---|---|
| Brine Density (g/cm3) | 1.75 | 1.75 | 1.75 | 1.75 | 1.75 | 1.75 |
| Alkalizing Agent, kg/m3 | 4 | 4 | 4 | 4 | 5 | 5 |
| Polipro XC Biopolymer, kg/m3 | 10 | 10 | 10 | 10 | 10 | 10 |
| Protec Vis Synth. Polym., kg/m3 | 0 | 4 | 8 | 12 | 15 | 15 |
| Bridging Agent, kg/m3 | 10 | 10 | 10 | 15 | 20 | 20 |
| Inhibishale Shale Inhibitor, l/m3 | 10 | 10 | 10 | 10 | 10 | 10 |
| Bulk Density (cP) | 40.5 | 40.5 | 45.0 | 47.0 | 62.5 | 75.0 |
| Plastic Viscosity (cP) | 33 | 30 | 39 | 40 | 52 | 64 |
| Yield (lb/100 ft2) | 15 | 21 | 12 | 14 | 21 | 22 |
| L600 (lb/100 ft2) | 81 | 81 | 90 | 94 | 125 | 150 |
| L300 (lb/100 ft2) | 48 | 51 | 51 | 54 | 73 | 86 |
| L200 (lb/100 ft2) | 32 | 37 | 35 | 38 | 53 | 61 |
| L100 (lb/100 ft2) | 17 | 21 | 19 | 22 | 30 | 33 |
| L6 (lb/100 ft2) | 2 | 3 | 3 | 4 | 5 | 4 |
| L3 (lb/100 ft2) | 1 | 2 | 2 | 3 | 4 | 3 |
| pH | 7.14 | 7.05 | 6.54 | 6.44 | 6.23 | 5.97 |
| API Filtrate (cm3) | | | | | 12.2 | 6.4 |
| APAT Filtrate (cm3) | | | | | 25.2 | 32.6 |
| Lubricity rate | | | | | 0.068 | |
| % Linear Swelling | | | | | 13.93 | |
| Marsh Viscosity (sec) | | | | | 148 | |

FIG. No. 2 shows the linear swelling of a shale sample with a 25 meq/100 g clay cation exchange capacity when undergoing the effects of the free-solids drilling fluid of the present invention with densities of 1.50 and 1.75 g/cc compared with freshwater.

The results shown in Tables Nos. 12 and 13 show the excellent thermal stability, rheological properties, filtration properties at low and high temperature, lubricating properties and inhibition properties of shale hydration that the solids-free drilling fluid system object of the present invention shows. Further, it is shown that the polymers used for the viscosification process of heavy brines do not require large times or high shear speeds and heating for performing their viscosification and rheological properties control functions, it should be noted that the rheological properties were maintained even when the formulation of the solids-free fluid drilling system embeds a Biopolymer in order to improve the suspension properties, which, when individually operated by itself has a thermal stability of about 120° C., this effect shows also another object of the invention in which a synergistic effect occurs between the synthetic polymer and the polymer that causes the biopolymer, due to the influence of the synthetic polymer, to increase its thermal stability temperatures above 200° C.

Example No. 7

Tables Nos. 14 and 15 show the excellent thermal rheological stability that the composition of the solids-free drilling fluid system object of the present invention have, with densities of 1.38 and 1.65 g/cc when undergoing the effects of high pressures and temperature. Both fluids were prepared according to the procedures described in Example No. 6 and were analyzed for their rheological behavior using a model 77 OFITE high temperature high pressure viscometer.

TABLE NO. 14

Rheological behavior of the Drilling Fluid System composition object of the present invention with a density of 1.38 g/cc ($CaCl_2$ brine) when undergoing the high pressure - high temperature effects.

| | Temp (° C.) | | | | | | | | | | | | |
|---|---|---|---|---|---|---|---|---|---|---|---|---|---|
| | 30 | 30 | 45 | 45 | 55 | 55 | 78 | 78 | 107 | 107 | 137 | 137 | 180 |
| Pressure (psi) | 15 | 15 | 8192 | 8192 | 8731 | 8731 | 9798 | 9798 | 10846 | 10846 | 11928 | 11928 | 13780 |

TABLE NO. 14-continued

Rheological behavior of the Drilling Fluid System composition object
of the present invention with a density of 1.38 g/cc (CaCl$_2$ brine) when undergoing
the high pressure - high temperature effects.

| | Temp (° C.) | | | | | | | | | | | | |
|---|---|---|---|---|---|---|---|---|---|---|---|---|---|
| | 30 | 30 | 45 | 45 | 55 | 55 | 78 | 78 | 107 | 107 | 137 | 137 | 180 |
| L600 | 253.0 | 253.1 | 252.2 | 251.8 | 247.8 | 247.8 | 248.3 | 248.2 | 256.8 | 256.9 | 256.8 | 256.8 | 256.6 |
| L300 | 145.1 | 151.1 | 147.5 | 146.2 | 145.9 | 146.6 | 146.6 | 145.1 | 143.5 | 143.6 | 143.5 | 143.5 | 143.2 |
| L200 | 108.9 | 105.1 | 109.6 | 105.1 | 107.1 | 109.5 | 110.6 | 104.2 | 100.2 | 100.3 | 100.2 | 100.2 | 99.7 |
| L100 | 54.0 | 52.6 | 54.1 | 52.5 | 54.7 | 56.6 | 54.1 | 59.9 | 60.6 | 60.6 | 60.5 | 60.5 | 59.4 |
| Va | 126.5 | 126.6 | 126.1 | 125.9 | 123.9 | 123.9 | 124.2 | 124.1 | 128.5 | 128.5 | 128.4 | 128.4 | 128.3 |
| Vp | 107.9 | 102.0 | 104.7 | 105.6 | 101.9 | 101.2 | 101.7 | 103.1 | 113.3 | 113.3 | 113.3 | 113.3 | 113.4 |
| Pc | 37.2 | 49.1 | 42.8 | 40.6 | 44.0 | 45.4 | 44.9 | 42.0 | 30.2 | 30.3 | 30.2 | 30.2 | 29.8 |

TABLE NO. 15

Rheological behavior of the Drilling Fluid System composition object
of the present invention with a density of 1.38 g/cc (CaCl$_2$—CaBr$_2$ brine) when
undergoing the high pressure - high temperature effects.

| | Temp (° C.) | | | | | | | | | | | | |
|---|---|---|---|---|---|---|---|---|---|---|---|---|---|
| | 30 | 30 | 45 | 45 | 55 | 55 | 78 | 78 | 107 | 107 | 137 | 137 | 180 |
| Pressure (psi) | 15 | 15 | 8192 | 8192 | 8731 | 8731 | 9798 | 9798 | 10846 | 10846 | 11928 | 11928 | 13780 |
| L600 | 288.1 | 288.1 | 288.4 | 288.4 | 288.1 | 288.2 | 288.1 | 288.1 | 288.1 | 288.1 | 288 | 288.1 | 288.2 |
| L300 | 166.1 | 166.1 | 166.7 | 166.7 | 166.2 | 166.4 | 166.1 | 166.2 | 166.1 | 166.2 | 165.9 | 166.1 | 166.3 |
| L200 | 114.1 | 114.1 | 114.9 | 115 | 114.3 | 114.5 | 114.1 | 114.3 | 114.1 | 114.1 | 113.9 | 114.1 | 114.5 |
| L100 | 68 | 68 | 69.9 | 69.9 | 68.6 | 69.1 | 68.4 | 68.6 | 68 | 68 | 67.6 | 68.1 | 68.9 |
| Va | 144.1 | 144.1 | 144.2 | 144.2 | 144.05 | 144.1 | 144.1 | 144.1 | 144.1 | 144.05 | 144 | 144.1 | 144.1 |
| Vp | 122 | 122 | 121.7 | 121.7 | 121.9 | 121.8 | 122 | 121.9 | 122 | 121.9 | 122.1 | 122 | 121.9 |
| Pc | 44.1 | 44.1 | 45 | 45 | 44.3 | 44.6 | 44.1 | 44.3 | 44.1 | 44.3 | 43.8 | 44.1 | 44.4 |

The results of Tables 14 and 15 show that the two solids-free drilling fluid compositions object of the present invention with densities of 1.38 and 1.65 g/cc, will not be affected in their rheological properties when such fluids are circulated into downhole during drilling, completing and repairing operations of oil wells, as the viscosity over the entire range of shear speeds, pressures and temperatures considered in the test remained constant, showing that same are not affected by the downhole high pressures and temperatures.

Example No. 8

Table No. 16 shows the behavior of the drilling, completing and repairing fluid system, when having an influx (pollution) of crude oil which could cause a reverse emulsion (water in oil). To simulate this condition a Solids-Free Fluid System object of the present invention was prepared using a CaCl$_2$—CaBr$_2$ binary brine with a density of 1.50 g/cc, and according to the formulation shown in the referred table, the surfactant (emulsifier) was added to a double sample which is part of the composition of this invention in a titer of 1% by volume, it was stirred in model 9B Hamilton Beach for 5 minutes to provide integration, then both samples of the Solids-free Drilling fluid system were polluted with 10% volume 30° API crude oil and the stirring continued for 30 minutes. It was allowed to stand for 1 hour in order to verify the separation of the crude oil (do not create emulsions, see FIG. No. 3), then the samples with and without emulsifier and polluted with 10% crude oil were rolled at 200° C. for 18 hrs in order to verify its thermal stability and afterwards study their rheological and separation from crude oil behaviors (see FIG. 4).

TABLE NO. 16

Rheological properties of the solids-free fluid system containing
1% demulsifier and polluted with 10% 30° API crude oil
before and after rolling at 200° C. for 18 hours.

| CONCEPT | BEFORE ROLLING | | | | After Rolling at 180° C., 18 hrs | |
|---|---|---|---|---|---|---|
| Brine Density (g/cm3) | 1.50 | 1.50 | 1.50 | 1.50 | 1.50 | 1.50 |
| Alkalizing Agent, kg/m3 | 4 | 4 | 4 | 4 | 4 | 4 |
| Polipro XC Biopolymer, kg/m3 | 10 | 10 | 10 | 10 | 10 | 10 |
| Bridging Agent, kg/m3 | 15 | 15 | 15 | 15 | 15 | 15 |
| Synthetic polymer (Protex Vis, kg/m3 | 15 | 15 | 15 | 15 | 15 | 15 |
| Shale Inhibitor (Inhibishale), l/m3 | 5 | 5 | 5 | 5 | 5 | 5 |

TABLE NO. 16-continued

Rheological properties of the solids-free fluid system containing
1% demulsifier and polluted with 10% 30° API crude oil
before and after rolling at 200° C. for 18 hours.

| CONCEPT | BEFORE ROLLING | | | | After Rolling at 180° C., 18 hrs | |
|---|---|---|---|---|---|---|
| Demulsifier (wt %) | 0 | 1 | 0 | 1 | 0 | 1 |
| Crude Oil, vol % | 0 | 0 | 10 | 10 | 10 | 10 |
| Bulk Density (cP) | 55.5 | 59 | 53.5 | 57 | 54 | 54 |
| Plastic Viscosity (cP) | 47 | 50 | 46 | 46 | 50 | 49 |
| Yield (lb/100 ft2) | 17 | 18 | 15 | 22 | 8 | 10 |
| L600 (lb/100 ft2) | 111 | 118 | 107 | 114 | 108 | 108 |
| L300 (lb/100 ft2) | 64 | 68 | 61 | 68 | 58 | 59 |
| L200 (lb/100 ft2) | 46 | 49 | 45 | 49 | 41 | 42 |
| L100 (lb/100 ft2) | 26 | 28 | 25 | 28 | 22 | 22 |
| L6 (lb/100 ft2) | 4 | 4 | 4 | 4 | 3 | 3 |
| L3 (lb/100 ft2) | 3 | 3 | 3 | 3 | 2 | 2 |
| pH | 10.2 | 01.4 | 10.1 | 10.2 | 10.1 | 10.0 |
| Gel 10"/10' | 4/6 | 4/6 | 4/5 | 4/5 | 3/4 | 3/4 |

FIG. No. 3 shows the separation of 30° API crude oil of the solids-free drilling fluid system containing 1% surfactant (emulsifier) after standing for 1 hour.

FIG. No 4 shows the separation of 30° API crude oil of the solids-free drilling fluid system with a density of 1.50 g/cc, containing 1% surfactant (emulsifier) after rolling at 200° C. for 18 hours and standing for 1 hour.

Figure 3:
Figure 4:
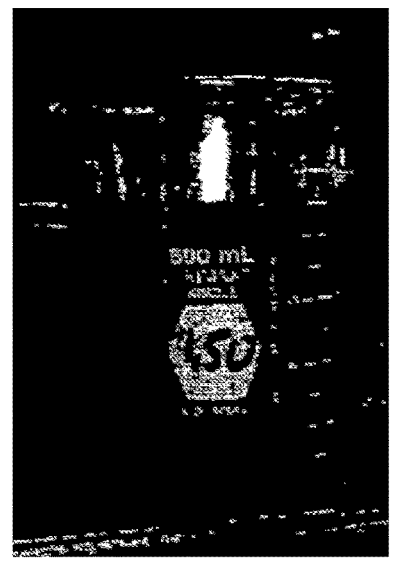
Figure 5:
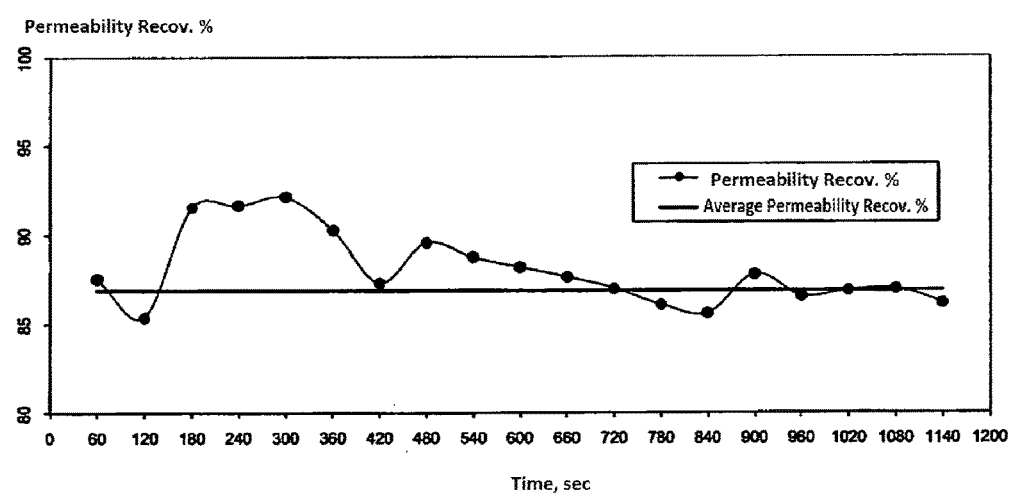

The results in Table No 16, FIGS. 3 and 4, show that the drilling fluid system object of the present invention is compatible with the productive formation fluids (crude oil) and when mixing same, emulsions that could damage the permeability of the formation will not be formed. Furthermore, it also demonstrates that the composition of the system resists temperatures of 200° C. perfectly, so it is inferred that the thermal resistance is higher than 200° C.

Example No. 9

FIG. No 5 and Table 17 show the data obtained from the permeability recovery % of the solids-free fluid system formulated with the composition of the present invention using binary brine with of density 1.45 g/cc. The permeability determination was performed using the "Procedure for Determining the Permeability Recovery %" ("Procedimiento para Determinar el % de Recuperación de Permeabilidad") of Cïa Protexa, S.A. de C.V., which consists in performing a filtration test (150° C., 500 psi) with the test fluid for 30 minutes using a ceramic disc with known permeability (or determined through Darcy permeability equation), then the ceramic disc is contacted with a solution of 15% HCL (filtration) to remove soluble materials that occluded the pore space of the disk, and finally, the final permeability of the disc is determined, for this purpose, a known viscosity fluid (i.e., glycerin) is used, and the same filtration equipment collects the volume of the known viscosity fluid that passes through the disk at different times and maintaining a constant differential pressure, with this information, and the Darcy permeability equation, the final permeability of the ceramic disk is estimated. Thus, the Permeability Recovery % permeability is obtained by dividing the final permeability between the initial permeability of the disk times 100.

FIG. No 5 shows the permeability recovery % of the Solids-Free Fluid System prepared with binary brine with density of 0.45 g/cc

TABLE 17

Volumes of filtered fluid data with respect to time using a 4
darcys ceramic disc at 150° C. and 500 psi differential
pressure (Solids-Free Fluid System with a density of 1.45 g/cc).

| Time Min | Filtered Vol. Ml | Pressure Psi | Filtered Vol. ml (filtration zone correction) |
|---|---|---|---|
| Spurt Mud | 0.1 | 500 | 0.2 |
| 3 | 2.2 | 500 | 4.4 |
| 8 | 4.6 | 500 | 9.2 |
| 15 | 2.7 | 500 | 5.4 |
| 23 | 2.4 | 500 | 4.8 |
| 30 | 2.1 | 500 | 4.2 |

While the invention may be susceptible to various modifications and alternative forms, the specific embodiments have been shown by way of example in the drawings and described in detail herein. However, it should be understood that the invention is not intended to be limited to the particular forms disclosed. Instead, the invention aims to cover all modifications, equivalents and alternatives falling within the spirit and scope of the invention as defined by the following appended claims.

The invention claimed is:

1. A composition for a solids-free drilling fluid system comprising:
   (a) divalent metal brine having up to 75 wt. % a divalent halide salt, based on the total weight of the brine;
   (b) 1 to 40 kg/m$^3$ of a synthetic homopolymer of dimethyl diallyl ammonium chloride;
   (c) 1 to 25 kg/m$^3$ of a *Xanthomonas campestris* derived biopolymer;
   (d) 1 to 15 kg/m$^3$ of an alkalizing agent;
   (e) 0.5 to 150 kg/m$^3$ a bridging agent;
   (f) 4 to 20 l/m$^3$ of a clay hydration inhibitor; and
   (g) 1 to 5% by volume of a demulsifier surfactant;
   wherein the composition has a thermal stability higher than 200° C.

2. The composition of claim 1 comprising 27 to 41 wt. % of the divalent halide salt.

3. The composition of claim 1, wherein the alkalizing agent is selected from the group consisting of $MgCO_3$, $CaO$, $Ca(OH)_2$, $NaOH$, $KOH$, $MgO$, $MgOH_2$, $NH_4OH$, $C_2H_7NO$, $C_4H_{11}NO_2$, and mixtures thereof.

4. The composition of claim 1, wherein the clay hydration inhibitor is a mixture of glycols and polyglycols having a molecular weight of 1200 grams/mol to 5000 grams/mol.

5. The composition of claim 1 comprising 1 to 100 kg/m$^3$ of the bridging agent.

6. The composition of claim 1, wherein the bridging agent is selected from the group consisting of MgO, MnO, CaO, CuO, ZnO, MgCO$_3$, CaCO$_3$, ZnCO$_3$, Ca(OH)$_2$, Mn(OH)$_2$, nutshell, coconut shell, cellulose fibers and insoluble resins, a mixture of CaCO$_3$ and MgCO$_3$, marble with a 95-99% purity with a particle size distribution meeting the Maximum Density Theory of Furnas, and a mixture thereof.

7. The composition of claim 1, wherein the demulsifier surfactant is selected from the group consisting of an ethoxylated nonylphenol, phenolic and oxy alkylated sulfonated resins, isopropylamine dodecyl benzene sulfonate, alkoxy ethylated epoxy resins, and mixtures thereof.

8. A method of drilling or repairing an oil well comprising introducing a composition of claim 1 into a productive formation and completing or repairing the oil well.

9. The composition of claim 8 comprising 27 to 41 wt. % of the divalent halide salt.

10. The method of claim 8, wherein the permeability damage of the productive formulation is reduced.

11. The method of claim 8, wherein the alkalizing agent is selected from the group of MgCO$_3$, CaO, Ca(OH)$_2$, NaOH, KOH, MgO, MgOH$_2$, NH$_4$OH, C$_2$H$_7$NO, C$_4$H$_{11}$NO$_2$, and mixtures thereof.

12. The method of claim 8, wherein the clay hydration inhibitor is a mixture of glycols and polyglycols having a molecular weight of 1200 grams/mol to 5000 grams/mol.

13. The method of claim 8 comprising 1 to 100 kg/m$^3$ of the bridging agent.

14. The composition of claim 8, wherein the bridging agent is selected from the group consisting of MgO, MnO, CaO, CuO, ZnO, MgCO$_3$, CaCO$_3$, ZnCO$_3$, Ca(OH)$_2$, Mn(OH)$_2$, nutshell, coconut shell, cellulose fibers and insoluble resins, a mixture of CaCO$_3$ and MgCO$_3$, marble with a 95-99% purity with a particle size distribution meeting the Maximum Density Theory of Furnas, and a mixture thereof.

15. The composition of claim 8, wherein the demulsifier surfactant is selected from the group consisting of an ethoxylated nonylphenol, phenolic and oxy alkylated sulfonated resins, isopropylamine dodecyl benzene sulfonate, alkoxy ethylated epoxy resins, and mixtures thereof.

* * * * *